US00RE35790E

United States Patent [19]

Pustanyk et al.

[11] E Patent Number: Re. 35,790

[45] Reissued Date of Patent: May 12, 1998

[54] SYSTEM FOR DRILLING DEVIATED BOREHOLES

[75] Inventors: Randal Harold Pustanyk, Millet; Laurier Emilo Comeau, Ledoc, both of Canada

[73] Assignee: Baroid Technology, Inc., Houston, Tex.

[21] Appl. No.: 582,832

[22] Filed: Jan. 2, 1996

Related U.S. Patent Documents

Reissue of:

[64] Patent No.: 5,163,521
Issued: Nov. 17, 1992
Appl. No.: 750,650
Filed: Aug. 27, 1991

[30] Foreign Application Priority Data

Aug. 27, 1990 [CA] Canada ..... 2024061

[51] Int. Cl.[6] ..... E21B 7/08; E21B 47/12

[52] U.S. Cl. ..... 415/40; 175/41; 175/45; 175/50; 175/61; 175/107; 367/83

[58] Field of Search ..... 175/26, 27, 45, 175/61, 107, 40, 41

[56] References Cited

U.S. PATENT DOCUMENTS

| | | | |
|---|---|---|---|
| 3,255,353 | 6/1966 | Scherbatskoy . | |
| 3,841,420 | 10/1974 | Russell | 175/45 |
| 3,889,228 | 6/1975 | Shawhan | 175/50 X |
| 3,930,220 | 12/1975 | Shawhan | 175/50 X |
| 4,001,773 | 1/1977 | Lamel et al. . | |
| 4,019,148 | 4/1977 | Shawhan | 328/167 |
| 4,021,773 | 5/1977 | Keenan . | |
| 4,067,404 | 1/1978 | Crase | 175/75 |
| 4,139,836 | 2/1979 | Chaney et al. | 166/208 X |
| 4,156,229 | 5/1979 | Shawhan | 328/128 X |
| 4,254,481 | 3/1981 | Smither et al. | 367/82 |
| 4,293,936 | 10/1981 | Cox et al. | 367/82 |
| 4,293,937 | 10/1981 | Sharp et al. | 367/82 |
| 4,298,970 | 11/1981 | Shawhan et al. | 367/82 |
| 4,320,473 | 3/1982 | Smither et al. | 367/82 |
| 4,324,297 | 4/1982 | Denison | 175/45 |
| 4,361,192 | 11/1982 | Trowsdale | 175/45 |
| 4,379,493 | 4/1983 | Thibodeaux | 175/61 |

(List continued on next page.)

FOREIGN PATENT DOCUMENTS

| | | |
|---|---|---|
| 1268938 | 3/1972 | United Kingdom . |
| 2102475 | 2/1983 | United Kingdom . |
| 2157746 | 10/1985 | United Kingdom . |

OTHER PUBLICATIONS

Proceedings, Measurement While Drilling Symposium, Louisiana State University; Telemetry Using the Propagation of an Electromagnetic Wave Along A Drill Pipe String; Baton Rouge, LA, Feb. 26–27, 1990, pp. 47–58, by R. Grudzinski and O. Issenmann.

Proceedings, Measurement While Drilling Symposiu, Louisiana State University; Wireless Electromagnetic Borehole Communications A State–of–the–Art Review; Baton Rouge, LA, Feb. 26–27, 1990, pp. 59–71, by L.A. Rubin, Wm. H. Harrison.

(List continued on next page.)

*Primary Examiner*—Frank Tsay
*Attorney, Agent, or Firm*—Browning Bushman

[57] ABSTRACT

Improved techniques are provided for drilling a deviated borehole through earth formations utilizing a rotary bit powered by a drill motor, and for obtaining information regarding the borehole or earth formations while drilling. An inclinometer is positioned below the drill motor and within a sealed cavity of a housing fixed to a drill motor sub, and a transmitter within the sealed cavity forwards acoustic or radial wave signals to a receiver provided in a measurement-while-drilling tool. The MWD tool may be provided within a non-magnetic portion of the drill string, and further houses an accelerometer for sensing borehole direction. Both borehole inclination and directional signals are transmitted to the surface by the MWD tool, and the drilling trajectory is altered in response to the signals.

20 Claims, 2 Drawing Sheets

U.S. PATENT DOCUMENTS

| | | | |
|---|---|---|---|
| 4,492,276 | 1/1985 | Kamp | 175/61 |
| 4,562,559 | 12/1985 | Sharp et al. | 367/82 |
| 4,577,701 | 3/1986 | Dellinger et al. | 175/61 |
| 4,662,458 | 5/1987 | Ho | 175/45 X |
| 4,697,651 | 10/1987 | Dellinger | 175/61 |
| 4,733,733 | 3/1988 | Bradley et al. | 175/45 |
| 4,854,397 | 8/1989 | Warren et al. | 175/45 X |
| 5,148,408 | 9/1992 | Matthews . | |
| 5,160,925 | 11/1992 | Dailey et al. . | |
| 5,410,303 | 4/1995 | Comeau et al. . | |

OTHER PUBLICATIONS

A relevant portion of a videotape entitled: "MWD: An Idea Whose Time Has Come".
A photographic image of the tool shown at the lecture, the photographic image being taken off the videotape.

A portion of a lecture recorded on videotape entitled: "MWD: An Idea Whose Time Has Come", by Kenneth R. Weeks, beginning at position 28:23, the lecture was given on Jul. 25, 1990.

A transcript of a relevant portion of the lecture recorded on Videotape.

"Field Measurements of Downhole Drillstring Vibrations", Wolf et al, SPE 14330, 1985.

"Downhole Recording System for MWD", Franz, SPE 10054, 1991.

"NL MWD Services", NL Industries, Inc., Houston, Texas.

"NL Sperry–Sun", 1987.

"Sperry–Sun Horizontal Drilling: A Total Engineering Concept", 1989.

SYSTEM FOR DRILLING DEVIATED BOREHOLES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to the drilling of boreholes and to survey and logging techniques used to determine the path and lithology of the drilled borehole. More particularly, the invention relates to an improved system for sensing the inclination of a borehole formed by a drill bit rotated by a downhole motor, for telemetering borehole inclination and associated logging data to the surface while drilling, and for altering the drilling trajectory in response to the telemetered data.

2. Description of the Background

Drilling operators which power a drill bit by rotating the drill string at the surface have previously measured downhole parameters with sensors located closely adjacent the drill bit, and adjusted the drilling trajectory in response to the sensed information. U.S. Pat. No. 4,324,297 discloses strain gages located directly above the drill bit to measure the magnitude and direction of side forces on the bit. The sensed information is transmitted to the surface by an electrical line, and the bit weight and rotational speed of the drill string may be altered in response to the sensed information to vary drilling trajectory.

In recent years, drilling operators have increasingly utilized downhole motors to drill highly deviated wells. The downhole motor or "drill motor" is powered by drilling mud pressurized by pumps at the surface and transmitted to the motor through the drill string to rotate the bit. The entire drill string need not be continually rotated during deviated drilling, which has significant advantages over the previously described technique, particularly when drilling highly deviated boreholes. A bent sub or bent housing may be used above the drill motor to achieve the angular displacement between the axis of rotation of the bit and the axis of the drill string, and thereby obtain the bend to effect curved drilling. Alternatively, the angular displacement may be obtained using a bent housing within the drill motor, by using an offset drive shaft axis for the drill motor, or by positioning a non-concentric stabilizer about the drill motor housing. As disclosed in U.S. Pat. No. 4,492,276, a relatively straight borehole may be drilled by simultaneously rotating the drill string and actuating the downhole motor, while a curved section of borehole is drilled by activating the downhole motor while the drill string above the motor is not rotated. U.S. Pat. No. 4,361,192 discloses a borehole probe positioned within the drill pipe above a drill motor and connected to surface equipment via a wireline. The probe includes magnetomers and accelerometers which measure orientation relative to the earth's magnetic field, and accordingly the probe is constructed of a non-ferromagnetic material.

Significant improvements have occurred in measuring-while-drilling (MWD) technology, which allows downhole sensors to measure desired parameters and transmit data to the surface in real time, i.e., substantially instantaneously with the measurements. MWD mud pulse telemetry systems transmit signals from the sensor package to the surface through the drilling mud in the drill pipe. Other MWD systems, such as those disclosed in U.S. Pat. Nos. 4,320,473 and 4,562,559, utilize the drill string itself as the media for the transmitted signals. U.S. Pat. No. 4,577,701 employs an MWD system in conjunction with a downhole motor to telemeter wellbore direction information to the surface. The telemetered information may be used to determine the duration of drill string rotation required to effect a change in the borehole curvature as previously described.

A downhole MWD tool typically comprises a battery pack or turbine, a sensor package, a mud pulse transmitter, and an interface between the sensor package and transmitter. When used with a downhole motor, the MWD tool is located above the motor. The electronic components of the tool are spaced substantially from the bit and accordingly are not subject to the high vibration and centrifugal forces acting on the bit. The sensor package may include various sensors, such as gamma ray, resistivity, porosity and temperature sensors for measuring formation characteristics or downhole parameters. In addition, the sensor package typically includes one or more sets of magnetometers and accelerometers for measuring the direction and inclination of the drilled borehole. The tool sensor package is placed in a non-magnetic environment by utilizing monel collars in the drill string both above and below the MWD tool. The desired length of the monel collars will typically be a function of latitude, well bore direction, and local anomalies. As a result of the monel collars and the required length of the downhole motor (including the power section, the bent sub, the bearing assembly), the sensor package for the MWD system is typically located from ten meters to fifty meters from the drill bit.

The considerable spacing between the MWD sensor package and the drill bit has long been known to cause significant problems for the drilling operator, particularly with respect to the measurement of borehole inclination. The operator is often attempting to drill a highly deviated or substantially horizontal borehole, so that the borehole extends over a long length through the formation of interest. The formation itself may be relatively thin, e.g. only three meters thick, yet the operator is typically monitoring borehole conditions or parameters, such as inclination, thirty meters from the bit. The substantial advantage of a real time MWD system and the flexibility of a downhole motor for drilling highly deviated boreholes are thus minimized by the reality that the sensors for the MWD system are responsive to conditions spaced substantially from the bit.

The disadvantages of the prior art are overcome by the present invention. Improved techniques are hereinafter disclosed for more accurately monitoring borehole conditions or parameters, such as borehole inclination, while drilling a deviated borehole utilizing a downhole motor.

SUMMARY OF THE INVENTION

A suitable embodiment of the invention includes an MWD tool, a downhole motor power section having a bent housing a downhole motor bearing assembly, and a drill bit in descending order in a drill string. A tool sensor package for the MWD tool includes one or more magnetometers, and accordingly the tool is positioned within monel collars to minimize magnetic interference. A power pack, an inclination sensor, and a transmitter may each be provided within a sealed cavity within the housing of the downhole motor bearing assembly, and preferably within a lower portion of the bearing housing adjacent the bit box. The inclinometer senses the angular orientation of the housing and thus the inclination of the well bore at a position closely adjacent the bit. The signal from the inclinometer is transmitted to a receiver in the MWD tool, and borehole inclination data is then transmitted by the MWD system to the surface for computation and display.

The inclination measurements are converted to frequency signals which are transmitted through the motor housing and drill string to the receiver in the MWD tool by a wireless system. Problems associated with power and data transmission wiring extending from the MWD tool to the inclinometer are avoided, yet the drilling operator benefits from inclination data sensed closely adjacent the bit. The motor housing is not rotated by the motor, so that the power pack, inclination sensor, and transmitter provided therein are not subject to continual centrifugal forces. Other conventional downhole sensors may also be provided within the bearing assembly housing closely adjacent the drill bit, and data may be reliably obtained and transmitted to the surface during the drilling mode thereby saving valuable drilling time. Also, much of the bit chatter is absorbed in the bearing assembly and torque transmission components along the drill motor, so that the sensors are not subject to high vibration although located closely adjacent the drill bit.

According to a preferred method of the present invention, a well bore direction sensor is provided within the MWD tool which is spaced substantially above the drill bit, while a well bore inclination sensor is positioned closely adjacent the drill bit within the housing of the drill motor bearing assembly. Data from the inclination sensor is transmitted to the MWD tool using a transmitter within the sealed cavity in the motor housing and a receiver in the MWD tool. Both well bore direction and well bore inclination data may then be transmitted to the surface in real time by mud pulse telemetry. The drilling operator is able to analyze inclination data sensed closely adjacent the bit, and thereby control the operation of the drill motor and the rotation of the drill string in response to this data to better maintain the drilled borehole at its desired inclination.

It is an object of the invention to provide an improved system for enabling a drilling operator to more accurately determine borehole characteristics or formation parameters when drilling a well utilizing a downhole motor and an MWD tool for transmitting sensed information to the surface.

It is another object of the invention to provide sensors positioned closely adjacent the drill box and within a lower portion of the drill motor bearing housing. Signals from the sensors are transmitted to the MWD tool located above the drill motor utilizing a transmitter within the bearing housing and a receiver in the MWD tool. The signals are then transmitted to the surface utilizing the MWD tool.

It is a feature of the present invention that electrical conductors are not utilized extending from the MWD tool to the sensors within the lower portion of the bearing housing. The wireless transmission system avoids substantial cost increases for the downhole motor and does not adversely restrict the versatility of the motor.

Yet another feature of the present invention is that sensors are provided within a cavity in the bearing housing, thereby allowing data sensed closely adjacent the drill bit to be transmitted to the surface in real time and without interrupting drilling operations.

It is an advantage of this invention that a power pack, inclinometer, and transmitter are located within a sealed cavity in a lower portion of the bearing housing. These components may be easily serviced or replaced at the rig site.

These and further objects, features and advantages of the present invention will become apparent from the following detailed description, wherein reference is made to the figures in the accompanying drawings.

DETAILED DESCRIPTION OF PREFERRED EMBODIMENTS

Figure 1:
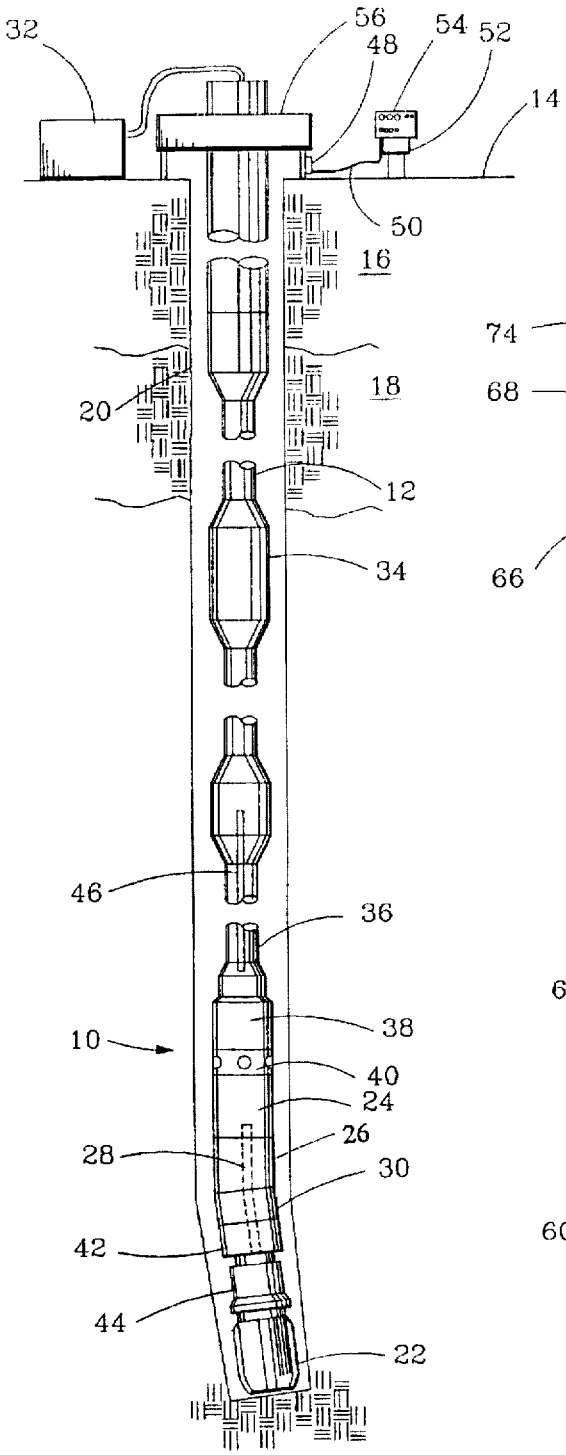
FIG. 1 is a simplified pictorial view of a drill string according to the present invention.

FIG. 1 depicts a simplified version of a system 10 according to the present invention for drilling a deviated borehole through earth formations while monitoring borehole characteristics or formation properties. This system includes a drill string 12 comprising lengths of conventional drill pipe extending from the surface 14 through a plurality of earth formations 16, 18. Borehole 20 is drilled by a rotary drill bit 22, which is powered by a fluid driven or mud motor 24 having a bent housing 26. The motor 24 rotates a drive shaft 28, which is guided at its lower end by radial and thrust bearings (not shown) within a bearing housing 30 affixed to the to housing of the mud motor. The motor 24 is driven by drilling mud which is forced by mud pumps 32 at the surface down the drill string 12. The majority of the drill string comprises lengths of metallic drill pipe, and various downhole tools 34, such as cross-over subs, stabilizer, jars, etc., may be included along the length of the drill string.

One or more non-magnetic lengths of drill string 36, commonly referred to as monel collars, may be provided at the lower end of the drill string above the drill motor. A conventional cross-over sub 38 preferably interconnects the lower end of a monel collar 36 to a by-pass or dump valve sub 40, and the mud motor 24 is fixedly connected directly to the sub 40. A lower sub 42 is fixedly connected at the lower end of the bearing housing 30, and contains a sealed cavity with electronics, as discussed subsequently. A rotary bit sub or bit box 44 extends from the lower sub 42, and is rotatable with the drill bit 22.

During straight line drilling, the drill pipe, the mud motor housing, the bearing housing, and any other housings coupled to the mud motor housing are rotated by the rotary table 56, and simultaneously the pumps 32 power the motor 24 to rotate the shaft 28 and the bit 22. During such drilling data representative of various sensed downhole parameters may be transmitted to the surface by an MWD tool 46 within one of the monel collars in the form of pressure pulses in the. Drilling mud which are received by a near surface sensor 48. The sensed data is then passed by lines 50 to a surface computer 52, which stores and processes the data for the drilling operator. If desired, data may be displayed in real time on a suitable medium such as paper or a screen 54. When the drilling operator desires to form a deviation or curve in the borehole, the mud motor 24 remains activated while the operator stops rotation of the drill string by the rotary table 56, with the result that the bit is caused to drill at an offset. During this stage of drilling, the MWD system conventionally is not transmitting data to the surface, but data may still be sensed and briefly stored within the MWD tool 46. When the desired offset is drilled, the rotary table 56 is again rotated to drill the borehole at the deviated angle, and during this stage stored data may be transmitted to the surface by the MWD tool.

According to the present invention, one or more sensors located very near the drill bit 22 and below the power section of the mud motor 24 provide information to a transmitter, which forwards the information by a wireless system to the MWD tool, which in turn transmits the information to the surface. The significant advantage of this invention is that data may be sensed very near the bit 22, rather than from 20 to 100 feet up from the bit where the MWD tool is typically located. This near bit sensing allows more meaningful data to be transmitted to the surface, since the operator would like to know the characteristics of the borehole and or the formation at a location very near the bit rather than at some location drilled hours previously. In particular, an accelerometer or inclinometer is preferably one of the near bit sensors, since information representing the inclination of the borehole closely adjacent the bit is valuable to the drilling operator. This data cannot be easily transmitted from a near bit location to the MWD tool, however, due to the presence of the intervening mud motor 24. The necessary complexity and desirable versatility of the mud motor are not well suited to accommodate conventional data transmission lines running through the motor. It is therefore preferred that the information is transmitted from a near bit location to the MWD tool by frequency modulated acoustic signals indicative of the sensed information. Accordingly, a near bit transmitter is provided within the lower sub 42, and a receiver is provided within the monel collar 36.

Figure 2:
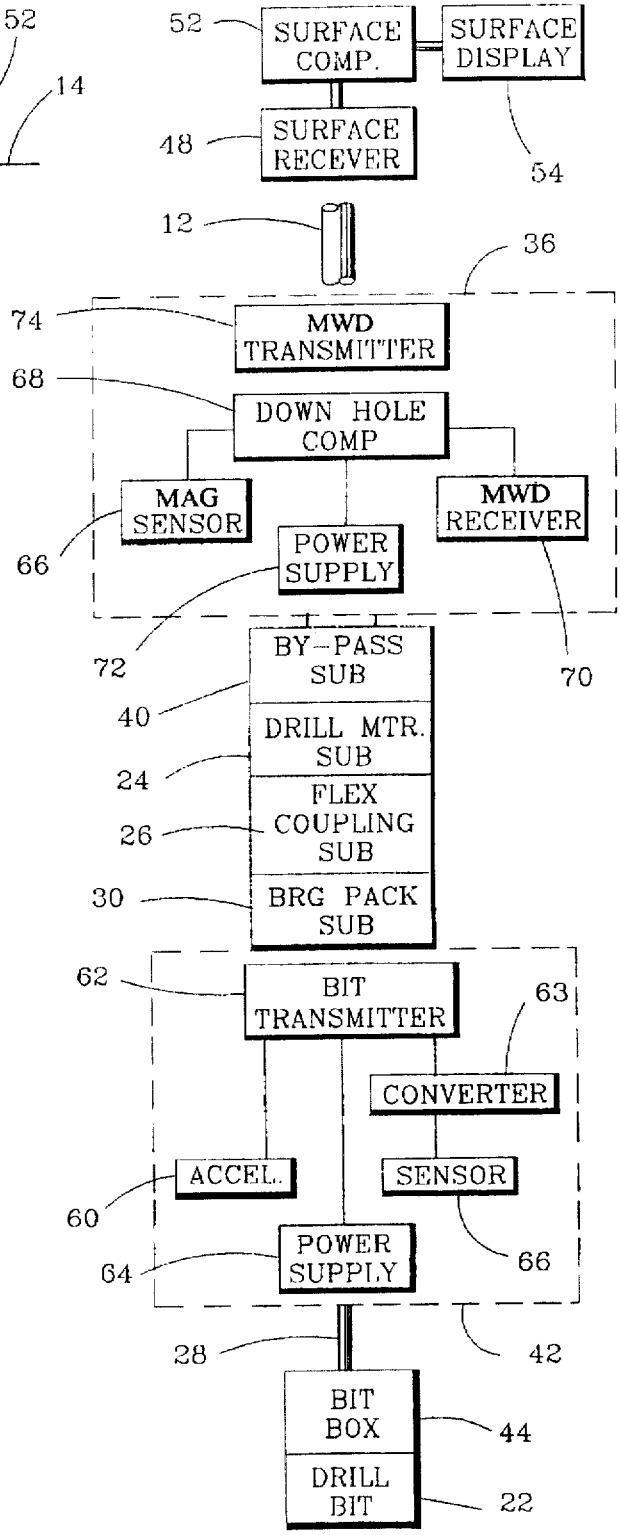
FIG. 2 is a simplified schematic diagram illustrating the components of a typical drilling and borehole surveying system according to the present invention to sense borehole trajectory and transmit sensed data to the surface for altering the drilling trajectory.

FIG. 2 generally depicts in block diagram form the primary components of the system according to the present invention, and the same numeral designations will be used for components previously discussed. At the lowermost end of the drill string and moving upward are the drill bit 22, the drill bit box 44 and the drive shaft 28 which extends up to the mud motor 24. The bit, bit box, and drive shaft all rotate with the respect to the remaining components of the drill string. The lower sub 42 is provided above the bit box and includes a sealed cavity which houses an accelerometer 60, a near bit transmitter 62, a power supply 64, and preferably one or more sensors 66 other than an accelerometer. Information from each sensor is transmitted by conventional wiring to the transmitter 62, which then forwards frequency modulated signals indicative of the sensed information to the MWD receiver in the monel collar 36. A voltage to frequency convertor 63 may be used to convert voltage signals from any sensor to frequency signals. The signals from transmitter 62 may pass through the metal housing between the lower sub 42 and an MWD receiver 70 within the monel collar 36. The transmitted signals may have a frequency representative of the sensed data, or the amplitude of the frequency signals may be a function of the information from the near bit sensors. Although signals of various frequencies may be transmitted, preferably the transmitted signals are acoustic signals having a frequency in the range of from 500 to 2,000 Hz. Acoustic signals may be efficiently transmitted for a distance of up to 100 feet through either the drilling mud or the metal housings. Alternatively, radio frequency signals of from 30 kilo-Hz to 3,000 mega-Hz may be used as the signals transmitted between the near bit transmitter and the MWD receiver, and these radio frequency signals may require less consumption of energy than acoustic signals.

The lower sub housing 42 may be keyed or otherwise fixed to and may structurally be an integral part of the housing for the bearing pack sub 30. A flexible coupling sub or bent sub 26 houses the drive shaft 28, and is fixedly connected at its lower end to the sub 30 and at its upper end to the drill motor sub 24. Subs 24, 26 and 30 are generally used as an assembly, and drilling operators commonly refer to this entire combination rather than only sub 24 as the downhole motor assembly. Fixed to the upper end of the drill motor sub 24 is by-pass sub 40, which includes conventional outlet ports for dumping excess fluid to the borehole.

Monel collar 36 is fixed to the sub 40, and houses the MWD tool 46 generally shown in FIG. 1. Tool 46 includes a magnetometer or other magnetic sensor 67, a downhole data storage device or computer 68, an MWD receiver 70 a power supply 72, and an MWD transmitter 74. Although it is generally preferred that the borehole or formation characteristics be sensed at a location below the drill motor 24, the magnetometer must be magnetically isolated from the metal housings for reasonable accuracy and reliability, and accordingly it is housed within the monel collar 36. If desired, other sensors, such as backup sensors, could also be provided within the monel collar 36, although preferably sensors other than the magnetic sensor are located at the near bit location. In addition to the inclinometer or accelerator 60, near bit sensors provided within the sub 42 may include a weight on bit sensor, a torque sensor, resistivity sensor, a neutron porosity sensor, a formation density sensor, a gamma ray count sensor, and a temperature sensor. Data from each of these sensors may thus be transmitted by the transmitter 62 to the MWD receiver 70. Since sensor 67 is closely adjacent the downhole computer 68, information from this sensor may be hard-wired directly to the computer 68, while the remaining information is received by the receiver 70 then transmitted to the computer 68.

Computer 68 may include both temporary data storage and data processing capabilities. In particular, information from various sensors may be encoded for each sensor and arranged by the computer so that like signals will be transmitted to the surface, with the signals from each sensor being coded for a particular sensor. Porosity signals, magnetometer signals, resistivity signals, inclination signals and temperature signals may thus be intermittantly transmitted to the surface by the MWD transmitter 74. Transmitter 74 preferably is a mud pulse transmitter, so that the information is passed by the pulse waves through the drilling mud in the drill string. The receiver 70, computer 68, transmitter 74 and any sensors within the monel collar may all be powered by the power supply 72.

Data may be transmitted from the monel collar 36 to the surface receiver 48, and preferably is transmitted through the mud within the drill string 12. The surface computer 52 stores and processes this information, and information may be displayed to the drilling operator on a monitor panel or display 54. Information may be sensed, and data transmitted, processed and displayed in "real time", so that the drilling operator may visually see a representation of borehole or formation characteristics which are being monitored at a position closely adjacent the drill bit and below the drill motor. The information may be obtained and displayed while the drill motor is activated, and the displayed information represents data sensed substantially at the time it is displayed.

Figure 3:
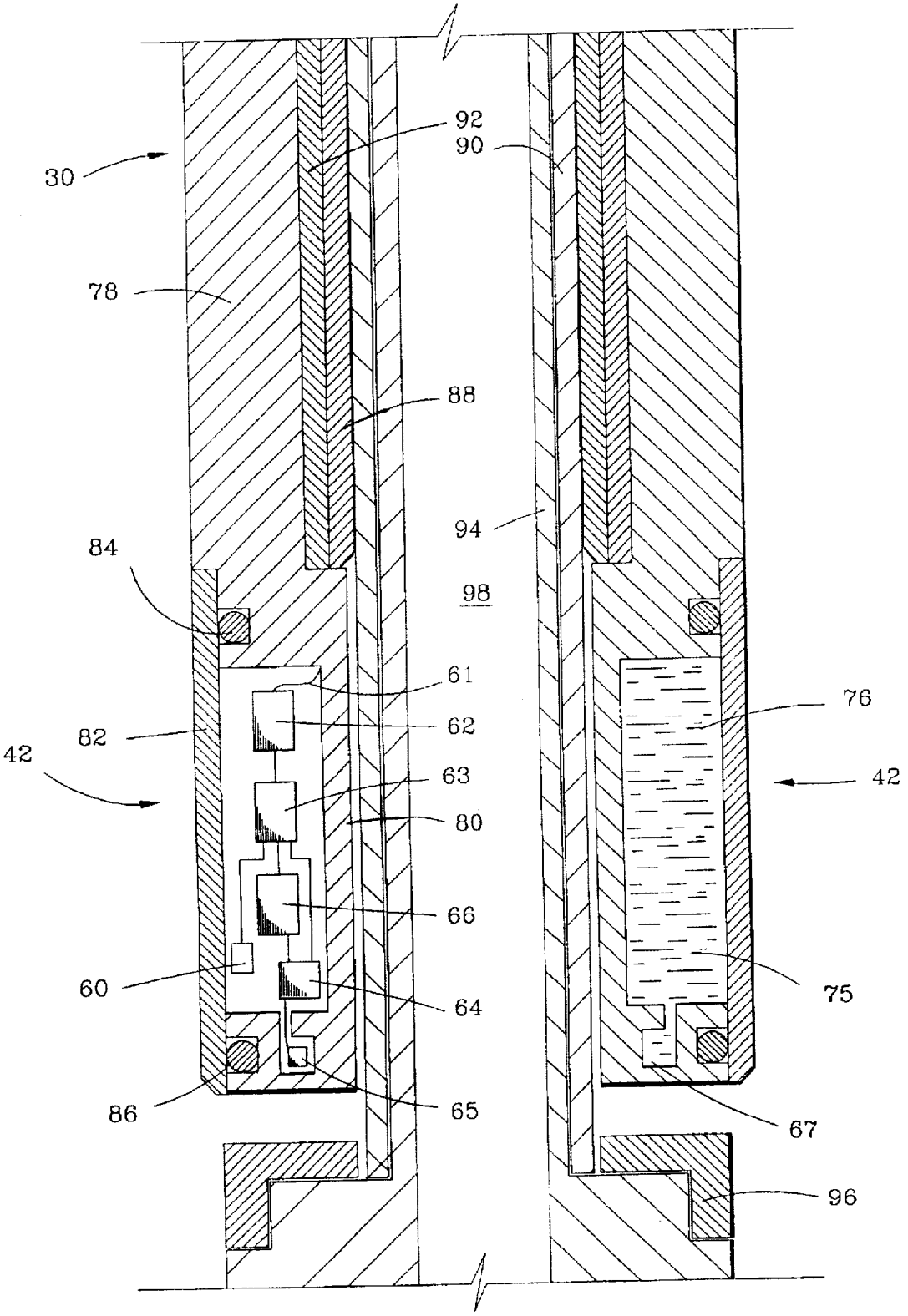
FIG. 3 is an axial section through a lower portion of a drill motor housing according to the present invention which schematically illustrates certain components within a sealed cavity in the motor housing.

FIG. 3 depicts the lower end of a suitable lower bearing housing secured to the end of the motor housing 26. The eccentric or set-off provided by the bent housing allows the reliable drilling of the deviated or curved borehole, and the housing 26 is provided below, i.e., nearer to the bit, than the motor 24. The sub 42 essentially provides a sealed cavity for the components shown in FIG. 2 within the sub 42, and may either be part of or attached to the assembly consisting of the mud motor 24 and/or the bearing housing 30, and optionally may also include the bent housing 26. The sealed cavity may be formed or by the housing for either the mud motor 24, the sub 26 or the housing 30, but preferably is within, below, or in part defined by the lower bearing housing so that it may be located near the bit 22.

The mud motor 24 may either be a positive displacement motor or a turbine motor, and utilizes pressurized fluid to drive a shaft 20 which is guided by the bearing housing 30. The bearing housing 30 comprises one or more sleeve-shaped, axially aligned, normally stationary outer subs, which may be threadably connected to motor housing sub 26. The bearing housing 30 also includes a mandrel rotated by the drive shaft 28, with the mandrel in turn defining a "full bore" interior fluid passageway for transmitting fluid to cool and clean the drill bit. The annular spacing between the outer subs and the inner mandrel is typically occupied by a plurality of marine bearings, wear sleeves, thrust bearing assemblies, radial bearings, etc. to guide the rotatable mandrel with respect to the outer subs and absorb some of the thrust load on the drill bit. The bearing housing assembly may be of the type wherein the bearings are lubricated by the drilling mud, or optionally may be sealed from the fluid passing through the mandrel and to the bit.

FIG. 3 depicts an embodiment wherein the annular sealed cavity 76 is defined by a lower portion of the bearing housing 30 and constituting the bearing lower sub 42. The lower bearing sub 42 of the housing 30 includes an integral recess and U-shaped lower body 80 to define cavity 76. The sub 42 comprises an outer sleeve 82 which is threadably connected to body 80, with a fluid-tight seal being formed by O-rings 84, 86 between the radially outwardly projecting legs of the body 80 and the sleeve 82. A wear sleeve 92 and a radial bearing 88 are positioned within the sub 42. The inner cylindrical surface of the radial bearing 88 is slightly less than the inner diameter of body 80, so that a sleeve extension 90 of a lower spacer sleeve normally engages the radial bearing 88 but not the body 80. The spacer sleeve and thus the extension 90 are attached to mandrel 94, so that the sleeve 90 and mandrel 94 rotate with respect to the body 80. A mandrel ring 96 is attached to mandrel 94 to secure the lower end of the sleeve 90 in place. The mandrel defines a cylindrical full bore 98 for passing the drilling fluid to the bit, and the bit box 44 may be threadably secured directly to the lower end of mandrel 94.

The sealed cavity 76 houses the FM transmitter 62, the accelerometer 60 to monitor borehole inclination, and a power supply 64, which may consist of a lithium battery pack or generator assembly. If the metal housings between the near bit sensors and the MWD receiver are used as the medium for transmitting FM signals, an electrical connector 61 may be used to electrically connect the output from the transmitter 62 to the sub 78. Any number of additional sensors represented by 66 may be provided within the sealed cavity to monitor near bit information. If desired, a small computer may also be provided within the cavity 76 to provide temporary data storage functions. The computer may include timing programs or circuitry to regulate the timing for transmitting FM signals for each of the sensors from the transmitter 62 to the receiver 70. Also, a turbine or eddy current generator 65 may be provided for generating electrical power to recharge the battery pack 64 or to directly power the sensors, computer and transmitter within the cavity 76. The generator 65 is stationary with respect to the adjoining rotary mandrel 94, and accordingly may be powered by the mandrel driven by the motor 24, so that no additional power supply is required for the generator 65. Once the electrical components are properly positioned and electrically connected within the cavity 76, a gel sealant 75 may be used to fill voids in the cavity 76 and thus protect the electric components from shock, vibration, etc.

Those skilled in the art should now appreciate the numerous advantages of the system according to the present invention. A fast, accurate, and low cost technique is provided for reliably obtaining and transmitting valuable near bit information past the drilling motor and to the surface. In particular, well bore inclination may be monitored at a near bit position, although well bore direction may be reliably sensed and transmitted to the surface from a position above the drill motor. Individual components of the system according to the present invention are commercially available, and the equipment is rig site service-able. Complex and unreliable hard-wiring techniques are not required to pass the information by the drill motor. Although reliable near bit information is obtained, the sensors are not normally rotated during ongoing drilling operations, so that the sensors and electrical components within the sealed cavity 76 are not subject to centrifugal forces caused by a drill bit rotating in the 50 to 600 RPM range. Moreover, the sub 42 is substantially isolated from the high vibrational forces acting on the drill bit due to the various bearing assemblies within the bearing housing 30. Moreover, the components in the sealed cavity 76 are further cushioned from vibration of the sub 78 due to the encapsulating gel 75. The angular or orientational position of the sensors within the sealed cavity 76 is fixed, and thus the position of any sensor with respect to the sub 42 and thus the drill string 12 may be determined and recorded.

While the invention has been described in connection with certain preferred embodiments, it should be understood that the disclosure of these embodiments is not intended to limit the invention. Dissimilarly, the described method is illustrative, and other methods and procedure variations will be suggested by this disclosure. Accordingly, the invention is intended to cover various alternatives, modifications, and equivalents in the described method and apparatus which are included within the scope of the claims.

What is claimed is:

1. A method of drilling a borehole through earth formations with a drill string including a rotary bit at the lower end thereof, and obtaining information regarding a downhole parameter indicative of the borehole or the earth formations, the bit being powered by a drill motor within the drill string and including a power assembly of the drill motor for converting pressurized fluid to rotation of a mandrel interconnected with the bit, a bearing assembly between the power assembly and the bit for guiding the mandrel, and a bearing housing for housing the bearing assembly, the method comprising:

sensing the downhole parameter using a sensor fixedly located in the drill string at a location axially below the power assembly;

transmitting signals functionally related to the sensed downhole parameter from a location axially below the power assembly;

receiving the transmitted signals at the surface to determine the downhole parameter; and altering the drilling trajectory in response to the transmitted signals.

2. The method as defined in claim 1, further comprising:

providing a non-magnetic portion of the drill string axially above the drill motor;

further sensing well bore direction at a location axially within the non-magnetic portion of the drill string;

inputting well bore direction signals to a measuring-while-drilling tool positioned within the drill string at a location above the drill motor;

transmitting the well bore direction signals to the surface to determine the direction of the well bore; and the drilling trajectory is altered in response to the transmitted downhole parameter signals and the transmitted well bore direction signals.

3. The method as defined in claim 2, wherein the measuring-while-drilling tool includes a mud pulse transmitter for transmitting data to the surface.

4. The method as defined in claim 1, further comprising:

providing a near bit housing having a sealed cavity rotationally fixed to the bearing housing; and sensing the downhole parameter utilizing a sensor positioned within the sealed cavity.

5. The method as defined in claim 4, further comprising:

providing one or more formation sensors within the sealed cavity to sense at least a selected one of formation characteristics from a group consisting weight on bit, torque, of resistivity, porosity, density, gamma ray count, and temperature.

6. The method as defined in claim 4, further comprising:

providing a power supply within the sealed cavity.

7. The method as defined in claim 6, wherein the power supply is driven in response to rotation of the mandrel with respect to the near bit housing.

8. The method as defined in claim 4, further comprising:

filling the sealed cavity with a protective material to minimize vibration to components within the sealed cavity.

9. The method as defined in claim 1, wherein the transmitted signals are acoustic signals having a frequency in the range of from 500 to 2,000 Hz.

10. The method as defined in claim 1, wherein the transmitted signals are radio signals having a frequency in the range of from 30 kilo-Hz to 3000 mega-Hz.

11. The method of drilling a deviated borehole through earth formations with a drill string including a rotary bit at the end thereof and obtaining information regarding a downhole parameter indicative of the borehole or the earth formations, the bit being powered by a drill motor within the drill string and including a power assembly for converting pressurized fluid to rotation of a mandrel interconnected with the bit, and a bearing assembly between the power assembly and the bit for guiding the mandrel, the method comprising:

monitoring borehole or earth formation characteristics using a sensor fixedly located in the drill string at a location axially below the power assembly;

transmitting signals functionally related to the monitored information from the location axially below the power assembly;

receiving the transmitted signals at the surface to determine the borehole or formation characteristic; and altering the drilling trajectory in response to the transmitted signals.

12. The method as defined in claim 11, further comprising:

providing a near bit housing having a sealed cavity rotationally affixed to the bearing housing; and sensing the borehole or formation information with a sensor provided within the sealed cavity.

13. The method as defined in claim 11, wherein the transmitted signals are acoustic signals having a frequency in the range of from 500 to 2,000 Hz.

14. The method as defined in claim 11, further comprising:

inputting the transmitted signals to a measuring-while-drilling tool positioned within the drill string at a location above the drill motor; and using a mud pulse transmitter within the measuring-while-drilling tool for transmitting data to the surface.

15. A system for drilling a deviated borehole through earth formations, including a drill string including a drill bit, the bit powered by a drill motor having a power assembly for converting pressurized fluid to rotation of a mandrel interconnected with the bit, a bearing assembly between the power assembly and the bit for guiding the mandrel, and a bearing housing for housing the bearing assembly, the system comprising:

a sealed cavity within the drill string at a location below the power assembly;

a sensor within the sealed cavity for sensing a downhole parameter;

a transmitter within the cavity for transmitting signals functionally related to the sensed downhole parameter; and a receiver spaced axially above the drill motor for receiving the transmitted signals and outputting downhole parameter signals.

16. The system as defined in claim 15, further comprising:

a non-magnetic portion of the drill string spaced axially above the drill motor;

a well bore direction sensor spaced within the non-magnetic portion of the drill string for outputting well bore direction signals; and a second transmitter for transmitting the well bore direction signals to the surface.

17. The system as defined in claim 15, further comprising:

an electrical power source within the cavity for powering the sensor and transmitter.

18. The system as defined in claim 17, wherein the electrical power source is an eddy current generator for generating electrical power in response to rotation of the mandrel.

19. The system as defined in claim 15, wherein the transmitter comprises:

a voltage to frequency converter for receiving voltage signals from the sensor and generating frequency signals in response thereto.

20. The system as defined in claim 15, further comprising:

a downhole computer for storing the transmitted signals.

* * * * *